United States Patent
Combs et al.

(10) Patent No.: US 8,966,499 B2
(45) Date of Patent: Feb. 24, 2015

(54) VIRTUAL SWITCH EXTENSIBILITY

(75) Inventors: Robert C. Combs, Redmond, WA (US); Pankaj Garg, Bellevue, WA (US); Sambhrama M. Mundkur, Sammamish, WA (US); Luis M. Hernandez, Seattle, WA (US); Alireza Dabagh, Kirkland, WA (US); Sandeep K. Singhal, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 96 days.

(21) Appl. No.: 13/229,130

(22) Filed: Sep. 9, 2011

(65) Prior Publication Data

US 2013/0067466 A1    Mar. 14, 2013

(51) Int. Cl.

| G06F 3/00 | (2006.01) |
|---|---|
| G06F 9/44 | (2006.01) |
| G06F 9/46 | (2006.01) |
| G06F 13/00 | (2006.01) |
| G06F 9/455 | (2006.01) |
| G06F 13/40 | (2006.01) |
| H04L 12/723 | (2013.01) |
| H04L 12/775 | (2013.01) |

(52) U.S. Cl.
CPC ............ G06F 9/455 (2013.01); G06F 13/4022 (2013.01); H04L 45/50 (2013.01); *G06F 2009/45595* (2013.01); *H04L 45/58* (2013.01)
USPC ........................................................ 719/313

(58) Field of Classification Search
None
See application file for complete search history.

(56) References Cited

U.S. PATENT DOCUMENTS

| 5,524,258 | A | * | 6/1996 | Corby et al. ..................... 712/19 |
|---|---|---|---|---|
| 5,583,868 | A |   | 12/1996 | Rashid et al. |
| 6,434,156 | B1 |   | 8/2002 | Yeh |
| 7,502,884 | B1 |   | 3/2009 | Shah et al. |
| 7,522,604 | B2 |   | 4/2009 | Hussain et al. |
| 7,590,755 | B2 |   | 9/2009 | Pinkerton et al. |
| 7,720,045 | B2 |   | 5/2010 | Bahl et al. |
| 7,761,578 | B2 |   | 7/2010 | Henry et al. |
| 7,920,478 | B2 | * | 4/2011 | Mistry et al. .................. 370/236 |
| 7,965,709 | B2 | * | 6/2011 | Du .............................. 370/389 |
| 7,966,620 | B2 |   | 6/2011 | Mundkur et al. |
| 8,219,697 | B2 | * | 7/2012 | Langen et al. ................ 709/230 |
| 8,345,692 | B2 | * | 1/2013 | Smith .......................... 370/396 |
| 2001/0021959 | A1 |   | 9/2001 | Holmberg et al. |
| 2005/0132364 | A1 |   | 6/2005 | Tewari et al. |
| 2005/0182853 | A1 | * | 8/2005 | Lewites et al. ................ 709/238 |
| 2006/0056446 | A1 |   | 3/2006 | Lee et al. |

(Continued)

OTHER PUBLICATIONS

"Packet ordering requirements in network infrastructure devices", Retrieved at <<http://netsecinfo.blogspot.com/2008/05/packet-ordering-requirements-in-network.html>>, May 5, 2008, pp. 3.

(Continued)

*Primary Examiner* — Andy Ho
*Assistant Examiner* — William C Wood
(74) *Attorney, Agent, or Firm* — John Jardine; Kate Drakos; Micky Minhas

(57) ABSTRACT

An extensible virtual switch allows virtual machines to communicate with one another and optionally with other physical devices via a network. The extensible virtual switch includes an extensibility protocol binding, allowing different extensions to be added to the extensible virtual switch. The extensible virtual switch also includes a miniport driver on which the extensions are loaded, tying the lifetimes of the extensions to the lifetime of the extensible virtual switch.

20 Claims, 5 Drawing Sheets

(56) References Cited

U.S. PATENT DOCUMENTS

| | | | |
|---|---|---|---|
| 2007/0106992 A1 | | 5/2007 | Kitamura |
| 2007/0300223 A1 | | 12/2007 | Liu |
| 2009/0265720 A1 | * | 10/2009 | Nagampalli et al. .......... 719/321 |
| 2012/0216273 A1 | * | 8/2012 | Rolette et al. ................... 726/13 |
| 2012/0320918 A1 | * | 12/2012 | Fomin et al. .................. 370/392 |
| 2013/0010636 A1 | * | 1/2013 | Regula .......................... 370/254 |

OTHER PUBLICATIONS

"Virtual Switch Configuration Strategy with VLAN", Retrieved at <<http://publib.boulder.ibm.com/infocenter/zvm/v6r1/index.jsp?topic=/com.ibm.zvm.v610.hcpa6/hcsc9c0173.htm>>, Retrieved Date: Jun. 26, 2011, pp. 5.

"International Search Report", Mailed Date: Sep. 24, 2012, Application No. PCT/US2011/055714, Filed Date: Oct. 11, 2011, pp. 9.

"Windows Server 2012 Hyper-V Component Architecture", Retrieved from <http://myitforum.com/myitforumwp/wp-content/uploads/2012/06/image159.png>, (Jun. 22, 2012), 1 page.

"Working with the IBM System Networking Distributed Virtual Switch 5000V in IBM Flex System Manager Network Control", Retrieved from <http://publib.boulder.ibm.com/infocenter/flexsys/information/index.jsp?topic=%2Fcom.ibm.sdnm.adv.helps.doc%2Ffnc0_r_panel_network_ctrl_distributed_virtual_switches.html> on May 9, 2013, (2012), 2 pages.

Sridharan, et al., "NVGRE: Network Virtualization using Generic Routing Encapsulation", Retrieved from <http://www.ietf.org/mail-archive/web/i-d-announce/current/msg39800.html> on May 3, 2013, (Sep. 14, 2011), 2 pages.

"International Search Report and Written Opinion", Application No. PCT/US2014/053964, Nov. 25, 2014, 13 Pages.

* cited by examiner

VIRTUAL SWITCH EXTENSIBILITY

BACKGROUND

Virtual machines are software implementations of a physical device that can run programs analogous to a physical device. Virtual machines can oftentimes communicate with one another, as well as other physical devices, using a switch. Virtual machines provide various benefits, but are not without their problems. One such problem is that situations can arise in which developers desire to implement switches having different functionality. However, designing new switches for each different desired functionality or combination of functionalities can be time consuming and burdensome for the developer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects a data packet is received, at an extensible virtual switch of a computing device, from a source. The extensible virtual switch allows one virtual machine of the computing device to communicate with another virtual machine of the computing device. The data packet is passed through one or more extensions to the extensible virtual switch, the extensible virtual switch communicating with the one or more extensions using a common protocol. After passing the data packet through the one or more extensions, the data packet is provided to a destination of the data packet.

In accordance with one or more aspects, a virtual switch miniport is included in an extensible virtual switch of a computing device. The extensible virtual switch allows a first virtual machine of the computing device to communicate with a second virtual machine of the computing device. One or more extensions to extend the functionality of the extensible virtual switch are loaded on the virtual switch miniport.

BRIEF DESCRIPTION OF THE DRAWINGS

The same numbers are used throughout the drawings to reference like features.

DETAILED DESCRIPTION

Virtual switch extensibility is discussed herein. An extensible virtual switch allows virtual machines to communicate with one another and optionally with other physical devices via a network. The extensible virtual switch includes an extensibility protocol binding and miniport driver, allowing different extensions to be added to the extensible virtual switch and thus extending the functionality of the extensible virtual switch. The extensions are loaded on the miniport driver, essentially tying the lifetimes of the extensions to the lifetime of the extensible virtual switch.

Figure 1:
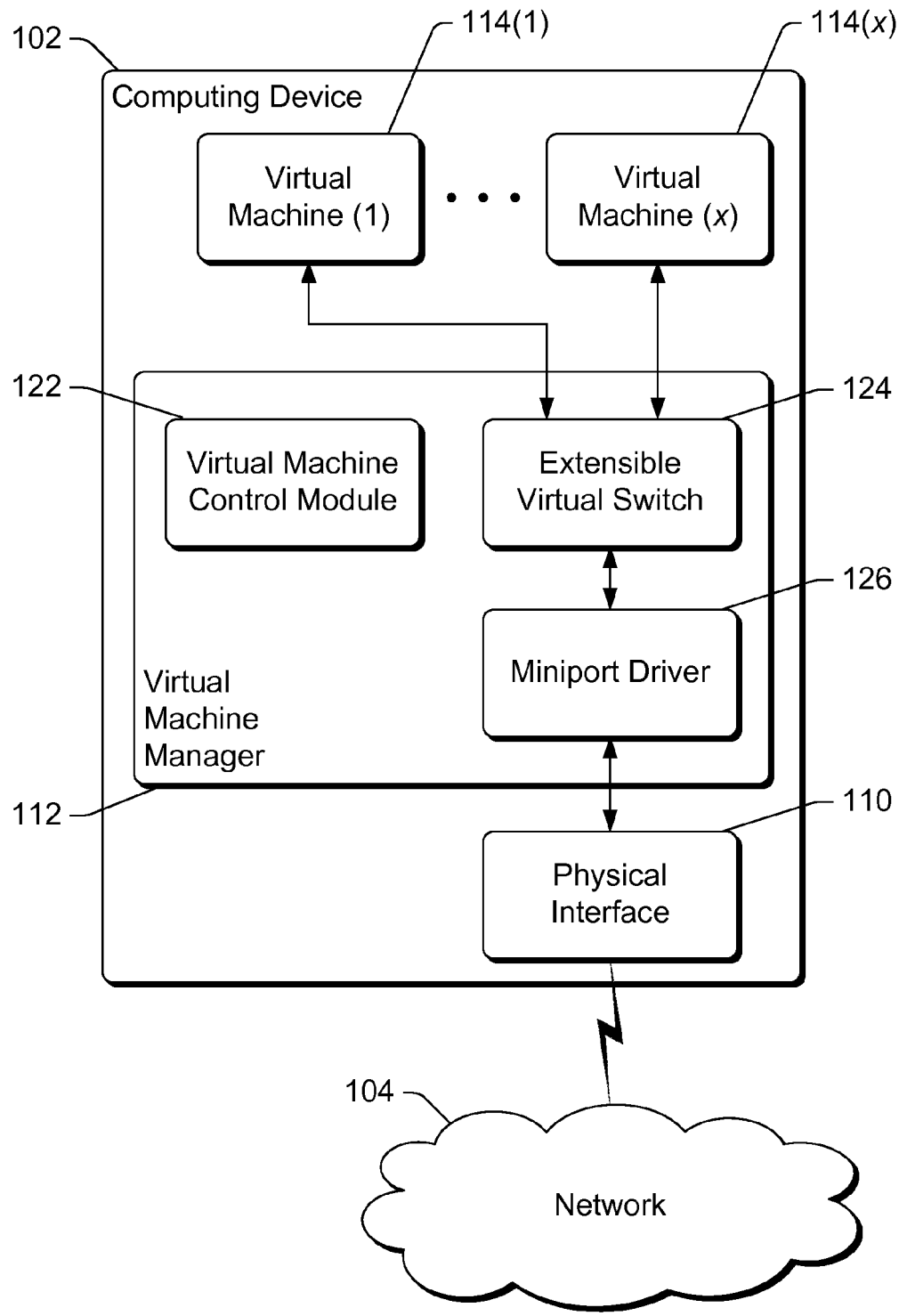
FIG. 1 is a block diagram illustrating an example system implementing the virtual switch extensibility in accordance with one or more embodiments.

FIG. 1 is a block diagram illustrating an example system 100 implementing the virtual switch extensibility in accordance with one or more embodiments. System 100 includes a computing device 102 coupled to a network 104. Network 104 can be a variety of different networks, including the Internet, a local area network (LAN), a public telephone network, an intranet, a personal area network (PAN), a storage area network (SAN), other public and/or proprietary networks, combinations thereof, and so forth. Computing device 102 can be a variety of different types of devices. For example, computing device 102 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth.

Computing device 102 includes a physical interface 110, a virtual machine manager 112, and one or more virtual machines 114(1), ..., 114(x). Physical interface 110 is a communication component, such as a wired and/or wireless network adapter (e.g., network interface card (NIC)). Virtual machine manager 112 manages the creation, operation, and termination of virtual machines 114, including access to the functionality provided by physical interface 110 for virtual machines 114. Although a single physical interface 110 is illustrated in FIG. 1, it should be noted that computing device 102 can include multiple physical interfaces of the same and/or different types, and that virtual machine manager 112 can manage access to the functionality provided by those multiple physical interfaces.

Virtual machine manager 112 allows one or more virtual machines 114 to run on computing device 102. Any number of virtual machines can run be on computing device 102. A virtual machine refers to a software implementation of a computing device (or other machine or system) that can run programs analogous to a physical computing device. Each virtual machine 114 can execute an operating system and other applications, and each such operating system and application need have no knowledge that it is executing in a virtual machine.

Virtual machine manager 112 includes a virtual machine (VM) control module 122, an extensible virtual switch 124, and a miniport driver 126. Virtual machine control module 122 manages the execution of virtual machines 114, allowing virtual machines to be run (launched) and terminated, controlling migrating of virtual machines from one computing device to another (e.g., between computing device 102 and another computing device via network 104), and so forth. Extensible virtual switch 124 allows virtual machines 114 to communicate with one another as well as optionally other physical devices via physical interface 110 and network 104. Extensible virtual switch 124 is extensible, allowing different extensions to be added to extensible virtual switch 124 as discussed in more detail below. Miniport driver 126 is an interface providing operations specific to physical interface 110 and allowing extensible virtual switch 124 to communicate with physical interface 110. Although a single miniport driver 126 is illustrated in computing device 102, if computing device 102 includes multiple physical interfaces 110 then computing device 102 also typically includes multiple miniport drivers 126 (one corresponding to each physical interface 110).

Although a single extensible virtual switch 124 is illustrated in computing device 102, it should be noted that computing device 102 can include any number of extensible virtual switches. Each extensible virtual switch can allow virtual machines 114 to communicate with one another and/or with other physical devices via physical interface 110 and/or other physical interfaces. Each extensible virtual switch can have different extensions loaded and/or have extensions loaded in different orders. The loading and ordering of extensions is discussed in more detail below.

Figure 2:
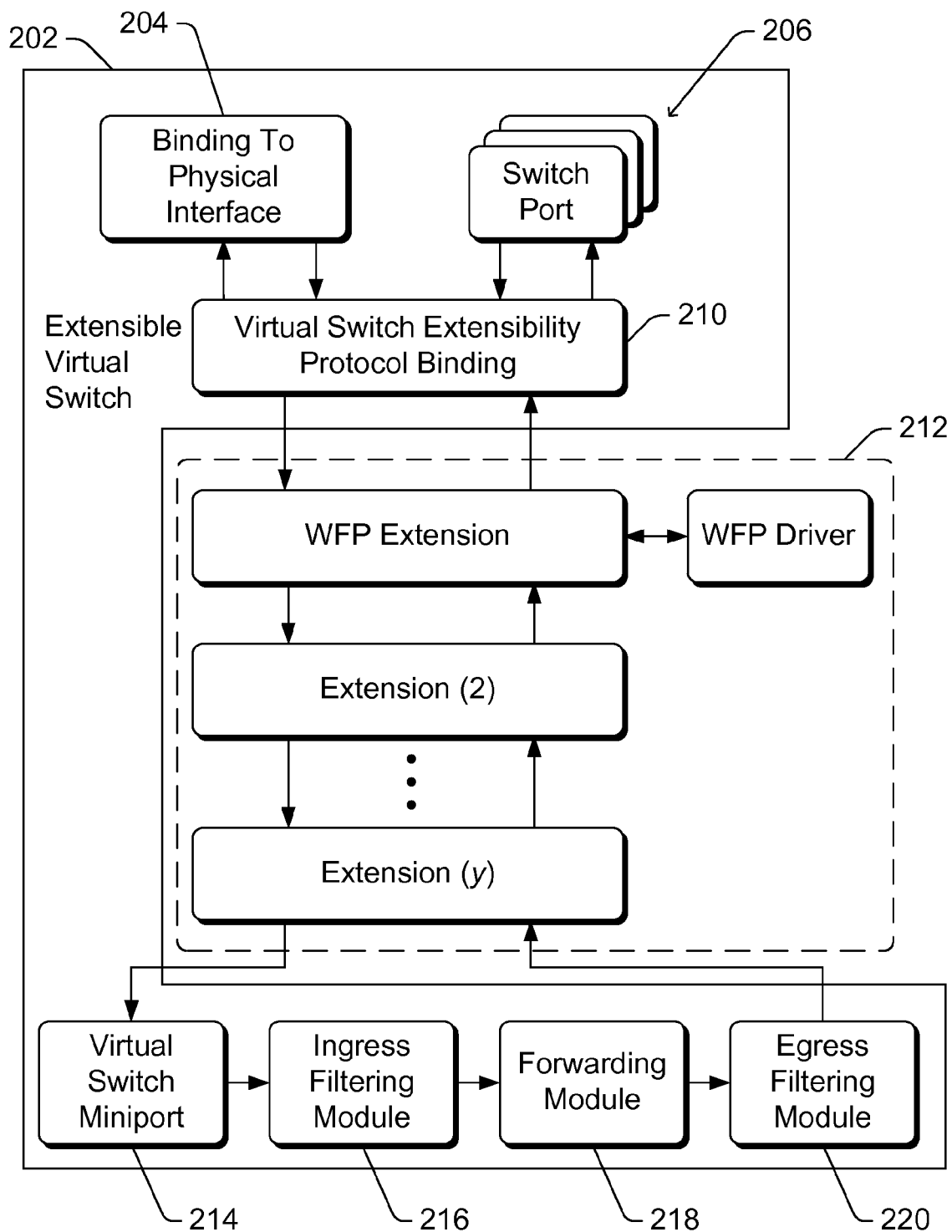
FIG. 2 illustrates an example extensible virtual switch in accordance with one or more embodiments.

FIG. 2 illustrates an example extensible virtual switch 202 in accordance with one or more embodiments. Extensible virtual switch 202 can be, for example, an extensible virtual switch 124 of FIG. 1. Extensible virtual switch 202 includes a binding 204 to a physical interface and one or more switch ports 206. Binding 204 is a binding to a physical interface, operating as an interface between extensible virtual switch 202 and a physical interface. Binding 204 receives data from and sends data to a physical interface, typically via a miniport driver (e.g., miniport driver 126 of FIG. 1).

Data is referred to herein as being communicated as data packets. A data packet refers to data plus various metadata associated with the data, such as an indication of the source of the data packet (e.g., a network address or other identifier of a virtual machine, a network address or other identifier of a physical device, etc.), an indication of the target or destination of the data packet (e.g., a network address or other identifier of a virtual machine, a network address or other identifier of a physical device, etc.), and so forth. Although discussed herein as being communicated using data packets, it should be noted that data can be communicated using various other data structures.

Each switch port 206 is a communication connection with a virtual machine network adapter (e.g., NIC). A virtual machine (e.g., each virtual machine 114 of FIG. 1) includes a VM network adapter that is similar to (but is a software implementation of) a physical network adapter (e.g., physical interface 110 of FIG. 1). A VM network adapter can connect or attach to a switch port 206, and a virtual machine can optionally have multiple VM network adapters each connecting or attaching to a different switch port 206. An operating system as well as other applications can execute on the virtual machine using the VM network adapter as they would using a physical network adapter, sending data packets to and receiving data packets from the VM network adapter.

Extensible virtual switch 202 also includes a virtual switch extensibility protocol binding 210. Extensibility protocol binding 210 exposes a set of interfaces that can be used by one or more extensions 212 to extend the functionality provided by extensible virtual switch 202. Extensions 212 are essentially inserted into the data flow path of extensible virtual switch 202, allowing data packets to be modified by extensions 212. Any number (y) of extensions 212 can be inserted into the data flow path of extensible virtual switch 202. Extensions 212 can provide various functionality, and extensible virtual switch 202 need not be modified in order for different extensions 212 to provide their functionality. Rather, extensible virtual switch 202 remains the same but the functionality provided by switch 202 can be extended using different extensions 212 with different functionality.

Extensible virtual switch 202 also includes a virtual switch miniport 214. Virtual switch miniport 214 is an interface that is presented to extensions 212 as if the interface were a conventional miniport driver (e.g., a miniport driver 126 of FIG. 1). However, virtual switch miniport 214 is an interface provided to support the extensibility of extensible virtual switch 202. Data packets received by virtual switch miniport 214 are passed back through extensions 212 rather than being communicated to a physical interface, as discussed in more detail below. Virtual switch miniport 214 can also be referred to as a hidden miniport or phantom miniport due to miniport 214 being used to support the extensibility of extensible virtual switch 202 rather than communicating data to and/or from a physical interface.

When extensible virtual switch 202 is created (e.g., instantiated) on a computing device, a VM control module (e.g., VM control module 122 of FIG. 1) allows one or more extensions 212 to be loaded on virtual switch miniport 214. Extensions 212 as loaded create an extension stack, analogous to a network stack that would be loaded on a conventional miniport driver (e.g., a miniport driver 126 of FIG. 1), except that the extension stack includes extensions loaded on a hidden miniport or phantom miniport.

The VM control module can determine which extensions are loaded in a variety of different manners. Generally, a request to have an extension loaded is received, such as from the extension itself or another component or module as part of a registration process. The VM control module can approve or disapprove an extension from being loaded, such as based on an identity of a vendor from which the extension is received, based on input from a user or administrator of the computing device running the VM control module, and so forth. Once an extension 212 is approved for loading, the VM control module loads the extension 212 each time the extensible virtual switch 202 is created on the computing device.

The VM control module can also determine the order in which extensions 212 are loaded in a variety of different manners. For example, the order in which extensions are loaded can be received as inputs from a user or administrator of the computing device running the VM control module, can be received from another component or module, and so forth. The VM control module maintains a record of this ordering, and loads extensions 212 in this ordering each time the extensible virtual switch 202 is created on the computing device.

It should be noted that the order in which extensions are loaded can be changed (reordered) at any time, resulting in a different ordering of extensions 212 the next time extensions 212 are loaded. The VM control module can determine the reordered ordering in which extensions are loaded in a variety of different manners. For example, the reordered ordering in which extensions are loaded can be received from a user or administrator of the computing device running the VM control module, can be received from another component or module, and so forth. The VM control module maintains a record of this reordered ordering, and loads extensions 212 in this reordered ordering each time the extensible virtual switch 202 is created on the computing device (unless the ordering is subsequently changed yet again).

Because extensions 212 are loaded on virtual switch miniport 214, each time the extensible virtual switch 202 is created on the computing device virtual switch miniport 214 is created and the extensions 212 are loaded on the virtual switch miniport 214. Thus, the extensions 212 are automatically loaded each time extensible virtual switch 202 is created. And, the extensions 212 are not loaded if extensible virtual switch 202 is not created. Similarly, if extensible virtual switch 202 is created but then deleted, then in response to deletion of extensible virtual switch 202 both virtual switch miniport 214 and the extensions 212 loaded on virtual switch miniport 214 are also deleted. Thus, the lifetimes of the extensions 212 are tied to the lifetime of extensible virtual switch 202—if extensible virtual switch 202 exists (has been created and is running) then extensions 212 also exist (have been loaded and are running), but if extensible virtual switch 202 does not exist (has not been created or is not running) then extensions 212 do not exist (have not been loaded or have been unloaded).

In one or more embodiments, virtual switch extensibility protocol binding 210 conforms to a common protocol, exposing a common application programming interface (API) that can be used by one or more extensions 212. This common API allows communication between extensions 212 and extensibility protocol binding 210. This communication includes communicating data packets, communicating control and/or status information, and so forth. The protocol being a common protocol refers to the protocol being a well-known protocol. In one or more embodiments, extensibility protocol binding 210 conforms to the Network Device Interface Specification (NDIS) protocol, including current and/or later versions of the NDIS protocol. However, in other embodiments extensibility protocol binding 210 can conform to other versions of the NDIS protocol and/or other protocols (such as the Open Data-Link Interface (ODI) protocol).

It should be noted that, by extensibility protocol binding 210 conforming to the NDIS or other known protocol and by the loading of extensions on virtual switch miniport 214, a break point in extensible virtual switch 202 is exposed. This break point appears as a conventional network stack to extensions 212, allowing developers of extensions 212 to design extensions 212 to insert into this break point using a known protocol and model that they are accustomed to working with. Developers need not redesign extensions 212 to work in a virtual machine environment, as the protocol the extensions 212 would use to communicate with a miniport driver in a non-virtual machine environment is the same protocol that is being supported by extensibility protocol binding 210. Thus, the virtual switch extensibility techniques discussed herein allow developers of extensions 212 to readily use extensions developed for non-virtual machine environments in virtual machine environments, and vice versa.

Virtual switch extensibility protocol binding 210 allows one or more extensions to communicate with extensible virtual switch 202, receiving data packets from and/or providing data packets to extensible virtual switch 202. Extensions 212 form an extension stack, each extension receiving a data packet, optionally performing one or more operations based on the data packet, and providing the data packet to the next extension in the stack. Data can be provided bi-directionally in the extension stack, both in an ingress direction and in an egress direction as discussed in more detail below. The ingress direction refers to the direction of data flow from binding 204 or a switch port 206 towards the virtual switch miniport 214, and the egress direction refers to the direction of data flow from the virtual switch miniport 214 towards binding 204 or a switch port 206. How extensions 212 are to provide data packets to one another and/or virtual switch miniport 214 can be determined in different manners. For example, when an extension 212 is loaded on virtual switch miniport 214, part of the loading process can be establishing (e.g., informing the extensions 212) how to provide data packets to one another and/or virtual switch miniport 214. By way of another example, the manner in which extensions 212 are to provide data packets to one another and/or virtual switch miniport 214 can be inherent in the protocol to which virtual switch extensibility protocol binding 210 conforms.

In one or more embodiments, extensions 212 are configured to directly receive data packets from and transfer data packets to other extensions 212. For example, the extension 212 illustrated as "WFP Extension" can receive data packets from extensible virtual switch 202, perform one or more operations based on the data packet, and transfer the data packet to the extension 212 illustrated as "Extension(2)". Alternatively, extensions 212 can be configured to communicate with other extensions 212 via extensible virtual switch 202. For example, the extension 212 illustrated as "WFP Extension" can receive data packets from extensible virtual switch 202, perform one or more operations based on the data packet, and return the data packet to extensible virtual switch 202, which can then transfer the data packet to the extension 212 illustrated as "Extension(2)".

Extensions 212 can perform any of a variety of different operations based on the data packet. These operations can include transforming or modifying data packets so that a data packet received by an extension 212 is different than the data packet transferred by that extension 212 to another extension 212. These operations can also include generating or modifying other data based on the data packet so that a data packet received by an extension 212 is the same as the data packet transferred by that extension 212 to another extension 212. For example, extensions 212 can encrypt and/or decrypt data in a data packet, can perform malware checks on data in a data packet, can monitor where data is being sent to and/or received from, can translate data in a data packet from one format to another, can restrict which other virtual machines another virtual machine can communicate with, can restrict which other physical devices a virtual machine can communicate with, and so forth. It should also be noted than an extension 212 need not perform any operation based on the data packet, and can simply transfer the data packet to another extension 212.

In one or more embodiments, one or more extensions 212 are protocol conversion extensions, allowing data packets to be converted from one protocol to another. Such a conversion extension can communicate with one or more additional extensions 212 using a different protocol or API, allowing various different extensions 212 to be used even if those extensions do not conform to the same protocol or API as extensibility protocol binding 210. For example, the extension 212 illustrated as "WFP Extension" can receive data packets from extensible virtual switch 202 and convert those data packets from the protocol used by extensibility protocol binding 212 (e.g., the NDIS protocol) to the Windows Filtering Platform (WFP). The extension can communicate with extensibility protocol binding 210 using the NDIS protocol API, can communicate with one or more other extensions using the WFP protocol API, and translates or converts data as appropriate between the NDIS and WFP protocols. Thus, one or more additional extensions 212, such as the extension 212 illustrated as "WFP driver" can be included in extensions 212 even though such additional extensions 212 do not use the same API as extensibility protocol binding 210.

During operation the data flow path for data packets through extensible virtual switch 202 and extensions 212 is as follows. A data packet is received by extensible virtual switch 202 via binding 204 or a switch port 206, and provided to virtual switch extensibility protocol binding 210. Extensibility protocol binding 210 provides the data packet to an extension 212. The extension 212 to which the data packet is provided is the top extension 212 in the extension stack, and the data packet is transferred in the ingress direction through the extension stack. The order of the extensions can be determined in different manners as discussed above. One extension 212 is determined to be the top of the extension stack, and is the extension 212 illustrated as "WFP Extension" in the example of FIG. 2. Another extension 212 is determined to be the bottom of the extension stack, and is the extension 212 illustrated as "Extension (y)" in the example of FIG. 2. The extension at the top of the extension stack (also referred to as the top extension) is the extension 212 that initially (before any other extension 212) receives data packets from extensible virtual switch 202. The extension at the bottom of the extension stack (also referred to as the bottom extension) is the extension 212 that last (after all other extensions 212) receives data packets prior to transferring the data packets to virtual switch miniport 214. Data packets being transferred from the top of the extension stack to the bottom of the extension stack are also referred to as passing in the ingress direction through the extension stack. Data packets being transferred from the bottom of the extension stack to the top of the extension stack are also referred to as passing in the egress direction through the extension stack.

After passing in the ingress direction through extensions 212, the data packet is received by virtual switch miniport 214. Virtual switch miniport 214 provides the data packet 214 to ingress filtering module 216. Ingress filtering module 216 can perform various filtering of data packets (whether received from binding 204 or a switch port 206), preventing or allowing data packets from being communicated to their requested destination based on various ingress filtering criteria. For example, the ingress filtering criteria can identify (e.g., based on network addresses) one or more data packet sources, and ingress filtering module 216 prevents a data packet from being communicated to its destination if the data packet is received from one of the identified one or more data packet sources.

If ingress filtering module 216 determines the data packet is not allowed to be transferred to its requested destination, then module 216 stops the data packet (e.g., deletes or otherwise ignores the data packet). However, if ingress filtering module 216 determines that the data packet is allowed to be transferred to its requested destination, then ingress filtering module 216 provides the data packet to forwarding module 218, which performs one or more forwarding operations on the data packet. Generally, such forwarding operations include modifying or generating a network address of the destination of the data packet (as modified, if at all, by extensions 212). For example, the forwarding can include translating the network address of the destination from one format to another, translating the network address of the destination from one network address space to another, and so forth.

Forwarding module 218 provides the data packet to egress filtering module 220, which can perform various filtering of data packets, preventing or allowing data packets from being communicated to their requested destination based on various egress filtering criteria. For example, the egress filtering criteria can identify (e.g., based on network addresses) one or more data packet destinations, and egress filtering module 220 prevents a data packet from being communicated to its destination if the destination is one of the identified one or more data packet sources.

If egress filtering module 220 determines the data packet is not allowed to be transferred to its requested destination, then module 220 stops the data packet (e.g., deletes or otherwise ignores the data packet). However, if egress filtering module 220 determines that the data packet is allowed to be transferred to its requested destination, then egress filtering module 220 provides the data packet to an extension 212. The extension 212 to which the data packet is provided is the bottom extension 212 in the extension stack, and the data packet is transferred in the egress direction through the extension stack.

Each extension 212 can perform various operations based on the data packet as the data packet passes in the ingress direction and in the egress direction through the extension stack. It should be noted that an extension 212 need not perform an operation based on each data packet as the data packet passes in the ingress direction and in the egress direction through the extension stack. For example, an extension 212 may perform an operation based on the data packet (e.g., encrypting the data in the data packet) as the data packet passes in the ingress direction through the extension stack, but not perform any operation based on the data packet as the data packet passes in the egress direction through the extension stack. By way of another example, an extension 212 may perform an operation based on the data packet (e.g., encrypting the data in the data packet) as the data packet passes in the ingress direction through the extension stack, and perform another operation based on the data packet (e.g., decrypting the data in the data packet) as the data packet passes in the egress direction through the extension stack.

After passing in the egress direction through extensions 212, the data packet is received by virtual switch extensibility protocol binding 210. Extensibility protocol binding 210 provides the data packet to the appropriate one of binding 204 (which transfers the data packet to its destination via a physical interface) or switch port 206 (which transfers the data packet to its destination virtual machine). Extensibility protocol binding 210 can determine whether to provide the data packet to binding 204 or a switch port 206 based on, for example, the network address of the destination of the data packet.

The data flow for each data packet (that is not stopped due to ingress filtering module 216 or egress filtering module 220, or a filter of an extension 212) follows the same paths in the ingress direction and in the egress direction through the extensions 212. Thus, the virtual switch extensibility techniques discussed herein provide a deterministic ordering of the extensions 212 for data packets. Each data packet passes in the ingress direction through the extensions 212 in the extension stack beginning at the same top of the extension stack and finishing at the same bottom of the extension stack, and passes in the egress direction through the extensions 212 in the extension stack beginning at the same bottom of the extension stack and finishing at the same top of the extension stack.

Extensible virtual switch 202 is illustrated as including both binding 204 and one or more switch ports 206. Alternatively, an extensible virtual switch 202 can be implemented that excludes support for communication with other devices via a physical interface. For example, an extensible virtual switch 202 may only support communication among virtual machines, or among virtual machines and a host operating system on the computing device implementing the virtual machines. In such embodiments, extensible virtual switch 202 need not include binding 204.

Additionally, in one or more embodiments, virtual machine network adapters can have various extension criteria that are to be satisfied by an extensible virtual switch in order for the virtual machine network adapter to connect to an extensible virtual switch. These extension criteria identify various extensions 212 that are to be loaded by an extensible virtual switch and/or are not to be loaded by an extensible virtual switch in order for the virtual machine to use the extensible virtual switch. A virtual machine network adapter has associated extension criteria (e.g., set by a user or administrator), and the virtual machine control module (e.g., module 122 of FIG. 1) verifies that an extensible virtual switch satisfies the associated extension criteria before connecting the virtual machine network adapter to a switch port of the extensible virtual switch.

For example, a particular virtual machine network adapter may be configured to transmit data packets to other physical devices over the Internet, and thus have extension criteria indicating that the extensible virtual switch is to have an extension loaded that performs encryption of data packets. The virtual machine control module verifies that a particular extensible virtual switch has an extension loaded that performs encryption of data packets. If the particular extensible virtual switch has an extension loaded that performs encryption of data packets, then the virtual machine control module allows the particular virtual machine network adapter to connect to that particular extensible virtual switch. However, if the particular extensible virtual switch does not have an extension loaded that performs encryption of data packets, then the virtual machine control module does not allow the particular virtual machine network adapter to connect to that particular extensible virtual switch.

The extension criteria can be used when virtual machines and/or extensible virtual switches are created. For example, the virtual machine control module verifies that a particular extensible virtual switch satisfies the extension criteria when a virtual machine and/or extensible virtual switch is created, and allows or prevents a virtual machine network adapter from connecting to a switch port of the extensible virtual switch based on whether the extensible virtual switch satisfies the extension criteria. The extension criteria can also be used when a virtual machine is migrated from one computing device to another computing device. In one or more embodiments, a virtual machine is migrated to another computing device only if an extensible virtual switch on the other computing device satisfies the extension criteria of the virtual machine network adapter. If the extension criteria of the virtual machine network adapter are not satisfied by an extensible virtual switch of another computing device, then the virtual machine having that virtual machine network adapter is not migrated to that other computing device.

Additionally, in one or more embodiments, virtual switch extensibility protocol binding 210 receives indications (e.g., via the API exposed by extensibility protocol binding 210) from an extension 212 when that extension 212 desires to perform an operation based on data packets. If one or more extensions 212 desire to perform at least one operation based on data packets, then the data flow path for data packets through extensible virtual switch 202 and extensions 212 is as discussed above. However, if none of extensions 212 desire to perform an operation based on data packets, then the data packets need not be provided to extensions 212. Rather, the data flow path for data packets can be from extensibility protocol binding 210 to virtual switch miniport 214 to ingress filtering module 216 to forwarding module 218 to egress filtering module 220 to extensibility protocol binding 210, bypassing extensions 212.

Figure 3:
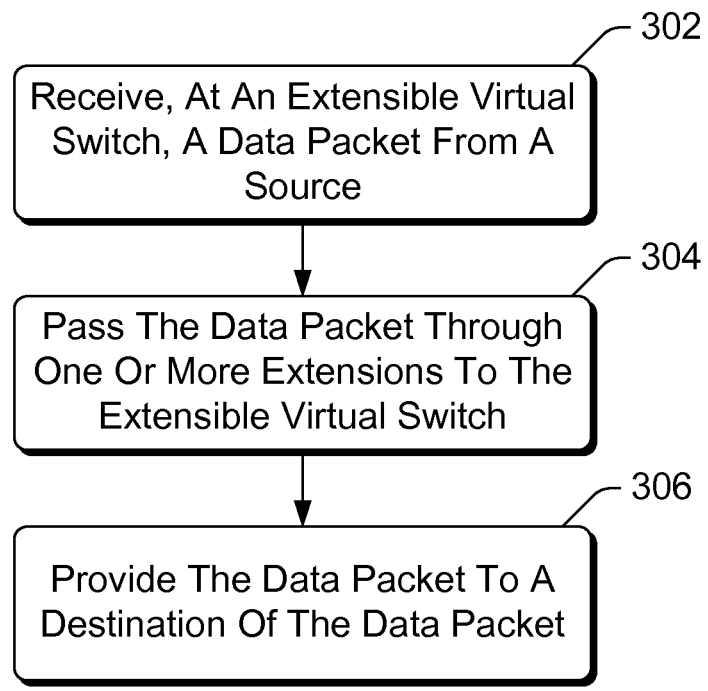
FIG. 3 is a flowchart illustrating an example process for implementing the virtual switch extensibility in accordance with one or more embodiments.

FIG. 3 is a flowchart illustrating an example process 300 for implementing the virtual switch extensibility in accordance with one or more embodiments. Process 300 is carried out by a device, such as computing device 102 of FIG. 1, and can be implemented in software, firmware, hardware, or combinations thereof. Process 300 is shown as a set of acts and is not limited to the order shown for performing the operations of the various acts. Process 300 is an example process for implementing the virtual switch extensibility; additional discussions of implementing the virtual switch extensibility are included herein with reference to different figures.

In process 300, a data packet is received at an extensible virtual switch of the device implementing process 300 (act 302). The data packet can be received from a virtual machine of the device implementing process 300 or from another device, as discussed above.

The data packet is passed through one or more extensions to the extensible virtual switch (act 304). The extensible virtual switch communicates with the one or more extensions using a common protocol, such as the NDIS protocol as discussed above.

The data packet is provided, after being passed through the one or more extensions, to a destination of the data packet (act 306). The destination can be a virtual machine of the device implementing process 300 or another device, as discussed above.

Figure 4:
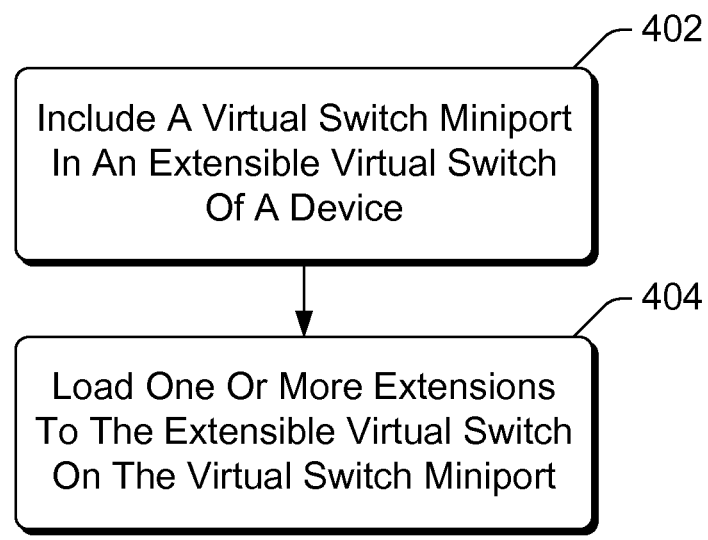
FIG. 4 is a flowchart illustrating another example process for implementing the virtual switch extensibility in accordance with one or more embodiments.

FIG. 4 is a flowchart illustrating another example process 400 for implementing the virtual switch extensibility in accordance with one or more embodiments. Process 400 is carried out by a device, such as computing device 102 of FIG. 1, and can be implemented in software, firmware, hardware, or combinations thereof. Process 400 is shown as a set of acts and is not limited to the order shown for performing the operations of the various acts. Process 400 is an example process for implementing the virtual switch extensibility; additional discussions of implementing the virtual switch extensibility are included herein with reference to different figures.

In process 400, a virtual switch miniport is included in an extensible virtual switch of the device implementing process 400 (act 402). The extensible virtual switch allows virtual machines of the device implementing process 400 to communicate with one another, and optionally to other devices as discussed above.

One or more extensions to extend the functionality of the extensible virtual switch are loaded on the virtual switch miniport (act 404). The lifetime of each of the one or more extensions is thus tied to the lifetime of the virtual switch miniport, as discussed above.

Figure 5:
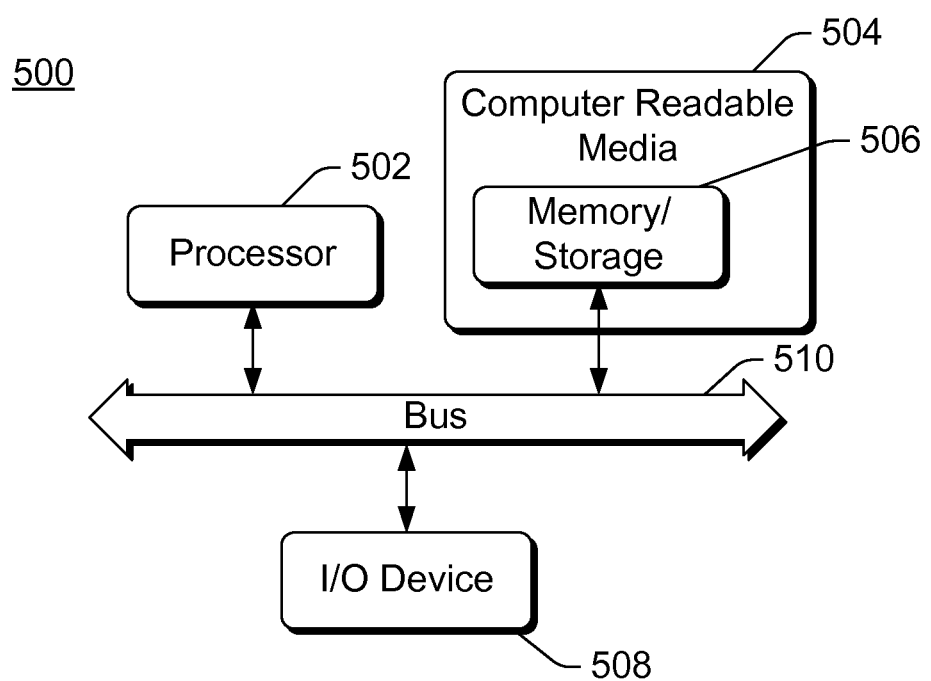
FIG. 5 illustrates an example computing device that can be configured to implement the virtual switch extensibility in accordance with one or more embodiments.

FIG. 5 illustrates an example computing device 500 that can be configured to implement the virtual switch extensibility in accordance with one or more embodiments. Computing device 500 can be, for example, a computing device 102 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Processor 502, computer readable media 504, one or more of devices 508, and/or bus 510 can optionally be implemented as a single component or chip (e.g., a system on a chip). Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the virtual switch extensibility techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, at an extensible virtual switch of a computing device, a data packet from a source, the extensible virtual switch allowing a first virtual machine of the computing device to communicate with a second virtual machine of the computing device;
receiving, from one or more extensions of the extensible virtual switch, an indication that the one or more extensions desire to perform an operation on the data packet; and
in response to the indication,
passing the data packet through the one or more extensions of the extensible virtual switch, each of the one or more extensions performing an operation on the data packet, the extensible virtual switch communicating with the one or more extensions using a common protocol, and
providing, after passing the data packet through the one or more extensions, the data packet to a destination of the data packet.

2. A method as recited in claim 1, one of the one or more extensions converting the data packet from an application programming interface (API) used by the common protocol to an API used by an additional protocol, allowing one or more additional extensions to extend the functionality of the switch using the additional protocol.

3. A method as recited in claim 1, further comprising:
allowing a first virtual machine network adapter of the first virtual machine to connect to one of multiple switch ports of the extensible virtual switch only if extension criteria of the first virtual machine network adapter are satisfied, the extension criteria of the first virtual machine network adapter identifying at least one extension that is to be included in the one or more extensions; and
allowing a second virtual machine network adapter of the second virtual machine to connect to one of the multiple switch ports of the extensible virtual switch only if extension criteria of the second virtual machine network adapter are satisfied, the extension criteria of the second virtual machine network adapter identifying at least one extension that is to be included in the one or more extensions.

4. A method as recited in claim 1, the one or more extensions comprising an extension stack, the passing comprising passing the data packet in an ingress direction through the extension stack, and then passing the data packet in an egress direction through the extension stack.

5. A method as recited in claim 4, the extension stack providing deterministic ordering of the one or more extensions.

6. A method as recited in claim 4, further comprising performing one or more forwarding operations on the data packet after the data packet is passed in the ingress direction through the extension stack but before the data packet is passed in the egress direction through the extension stack.

7. A method as recited in claim 4, the method further comprising receiving an administrator input indicating the ordering of the one or more extensions in the extension stack.

8. A method as recited in claim 1, the source comprising either the first virtual machine or the second virtual machine, and the destination comprising the other of the first virtual machine and the second virtual machine.

9. A method as recited in claim 1, the one or more extensions comprising multiple extensions, and each of the multiple extensions performing a different operation on the data packet as the data packet is passed through the multiple extensions.

10. A method as recited in claim 9, a first extension of the multiple extensions encrypting data in the data packet or decrypting data in the data packet.

11. One or more computer storage media having stored thereon multiple instructions that, when executed by one or more processors of a computing device, cause the one or more processors to:
include, in an extensible virtual switch of the computing device, a virtual switch miniport, the extensible virtual switch allowing a first virtual machine of the computing device to communicate with a second virtual machine of the computing device; and
load, on the virtual switch miniport, one or more extensions to extend the functionality of the extensible virtual switch, the one or more extensions performing a plurality of operations on data packets passing through the one or more extensions.

12. One or more computer storage media as recited in claim 11, the multiple instructions further causing the one or more processors to expose, to the one or more extensions, an application programming interface (API) conforming to a common protocol.

13. One or more computer storage media as recited in claim 11, the extensible virtual switch excluding support for communication with other computing devices via the extensible virtual switch.

14. One or more computer storage media as recited in claim 11, the one or more extensions comprising an extension stack providing deterministic ordering of the one or more extensions, the multiple instructions further causing the one or more processors to pass data packets received at the extensible virtual switch in an ingress direction through the extension stack, and then in an egress direction through the extension stack.

15. One or more computer storage media as recited in claim 11, the plurality of operations on the data packets including each of the one or more extensions performing an operation on the data packets.

16. One or more computer storage media as recited in claim 14, the multiple instructions further causing the one or more processors to perform one or more forwarding operations on the data packets after the data packets are passed in the ingress direction through the extension stack but before the data packets are passed in the egress direction through the extension stack.

17. One or more computer storage media as recited in claim 11, the multiple instructions further causing the one or more processors to delete, in response to the extensible virtual switch being deleted, both the virtual switch miniport and the one or more extensions.

18. One or more computer storage media as recited in claim 11, the multiple instructions further causing the one or more processors to:
include, in an additional extensible virtual switch of the computing device, an additional virtual switch miniport, the additional extensible virtual switch allowing the first virtual machine to communicate with the second virtual machine; and
load, on the additional virtual switch miniport, at least one extension to extend the functionality of the additional extensible virtual switch, the at least one extension being different extensions than the one or more extensions loaded on the virtual switch miniport or being the one or more extensions loaded in a different order than the one or more extensions are loaded on the virtual switch miniport.

19. One or more computer storage media as recited in claim 11, the instructions causing the one or more processors to load the one or more extensions comprising instructions causing the one or more processors to:
allow a first virtual machine network adapter of the first virtual machine to connect to one of multiple switch ports of the extensible virtual switch only if extension criteria of the first virtual machine network adapter are satisfied, the extension criteria of the first virtual machine network adapter identifying at least one extension that is to be included in the one or more extensions; and
allow a second virtual machine network adapter of the second virtual machine to connect to one of the multiple switch ports of the extensible virtual switch only if extension criteria of the second virtual machine network adapter are satisfied, the extension criteria of the second virtual machine network adapter identifying at least one extension that is to be included in the one or more extensions.

20. A method comprising:
receiving, at an extensible virtual switch of a computing device, a data packet from a source, the extensible virtual switch allowing a first virtual machine of the computing device to communicate with a second virtual machine of the computing device;
receiving, from one or more extensions of the extensible virtual switch, an indication that the one or more extensions desire to perform an operation on the data packet;
in response to the indication,
passing the data packet through the one or more extensions of the extensible virtual switch that are loaded on a virtual switch miniport of the extensible virtual switch to extend the functionality of the extensible virtual switch, each of the one or more extensions modifying data packets passing through the one or more extensions, the extensible virtual switch communicating with the one or more extensions using a first protocol, and one of the one or more extensions converting the data packet from an application programming interface (API) used by the first protocol to an API used by a second protocol, and providing, after passing the data packet through the one or more extensions, the data packet to a destination of the data packet.

* * * * *